United States Patent
Tanaka et al.

(10) Patent No.: US 10,539,653 B2
(45) Date of Patent: Jan. 21, 2020

(54) METHOD FOR DETECTING POSITION OF MOBILE BODY

(71) Applicant: Murata Manufacturing Co., Ltd., Nagaokakyo-shi, Kyoto-fu (JP)

(72) Inventors: Yuta Tanaka, Nagaokakyo (JP); Michio Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 273 days.

(21) Appl. No.: 15/713,788

(22) Filed: Sep. 25, 2017

(65) Prior Publication Data
US 2018/0011168 A1    Jan. 11, 2018

Related U.S. Application Data

(63) Continuation of application No. PCT/JP2016/057950, filed on Mar. 14, 2016.

(30) Foreign Application Priority Data

Mar. 26, 2015    (JP) .................................. 2015-064678

(51) Int. Cl.
*G01S 5/30*   (2006.01)
*G01S 5/18*   (2006.01)
(Continued)

(52) U.S. Cl.
CPC .................... *G01S 5/30* (2013.01); *G01S 1/72* (2013.01); *G01S 1/80* (2013.01); *G01S 5/18* (2013.01)

(58) Field of Classification Search
CPC ..... G01S 5/30; G01S 5/18; G01S 1/80; G01S 1/72

See application file for complete search history.

(56) References Cited

U.S. PATENT DOCUMENTS

2010/0152870 A1* 6/2010 Wanner ................ B23K 9/0256
                                                         700/97
2018/0011168 A1* 1/2018 Tanaka ...................... G01S 5/30

FOREIGN PATENT DOCUMENTS

CN      1484190 A        3/2004
CN    107407719 A  * 11/2017    ............... G01S 5/30
(Continued)

OTHER PUBLICATIONS

Translation of JP2005274363 (Year: 2005).*
(Continued)

*Primary Examiner* — Daniel Pihulic
(74) *Attorney, Agent, or Firm* — Keating & Bennett, LLP

(57) ABSTRACT

A method for detecting a position of a mobile body moving on a plane includes setting X-axis and Y-axis direction reference lines on the plane, disposing a dummy mobile body on intersection points of the reference lines, detecting a position of the dummy mobile body, determining position variation amounts at the intersection points as an X-axis direction error and a Y-axis direction error based on a difference from true position data, determining X-axis and Y-axis direction error approximate formulas based on the errors to calculate errors at each position on the reference lines, detecting the position of the mobile body, correcting acquired detected X-Y coordinate data by a linear interpolation method using the X-axis and Y-axis direction error approximate formulas, and obtaining position data close to the true position of the mobile body.

21 Claims, 12 Drawing Sheets

(51) Int. Cl.
*G01S 1/80* (2006.01)
*G01S 1/72* (2006.01)

(56) References Cited

FOREIGN PATENT DOCUMENTS

| | | | |
|---|---|---|---|
| JP | 6-324139 A | 11/1994 | |
| JP | 7-140241 A | 6/1995 | |
| JP | 8-54926 A | 2/1996 | |
| JP | 2005-274363 A | 10/2005 | |
| JP | WO2016152619 A1 * | 12/2017 | ............ G01S 5/30 |
| JP | 6515998 B2 * | 5/2019 | ............ G01S 1/72 |
| WO | WO-2016152619 A1 * | 9/2016 | ............ G01S 5/30 |

OTHER PUBLICATIONS

Translation of CN1484190A (Year: 2004).*
Official Communication issued in International Patent Application No. PCT/JP2016/057950, dated Jun. 7, 2016.
Official Communication issued in Chinese Patent Application No. 201680018123.5, dated Nov. 22, 2019.

* cited by examiner

FIG. 5

ERRORS AT INTERSECTION POINT (Ex, Ey, Eθ), UNIT (CM, CM, °)

|    | X1 | X2 | X3 | X4 | X5 | X6 | X7 |
|----|----|----|----|----|----|----|----|
| Y1 | (6.1, 6, 6) | (5, 5, 4.9) | (4, 4, 4) | (3, 3, 3) | (2, 2, 2) | (1, 1, 1) | (0, 0, 0) |
| Y2 | (5.5, 1, 5) | (4, 4, 4) | (3, 3, 3) | (2, 2, 2) | (1, 1, 1) | (0, 0, 0) | (-1, -1, -1) |
| Y3 | (4, 4, 4) | (3, 3, 3) | (2, 2, 2) | (1, 1, 1) | (0, 0, 0) | (-1, -1, -1) | (-2, -2, -2) |
| Y4 | (3, 3, 3) | (2, 2, 2) | (1, 1, 1) | (0, 0, 0) | (-1, -1, -1) | (-2, -2, -2) | (-3, -3, -3) |
| Y5 | (2, 2, 2) | (1, 1, 1) | (0, 0, 0) | (-1, -1, -1) | (-2, -2, -2) | (-3, -3, -3) | (-4, -4, -4) |
| Y6 | (1, 1, 1) | (0, 0, 0) | (-1, -1, -1) | (-2, -2, -2) | (-3, -3, -3) | (-4, -4, -4) | (-5, -5, -5) |
| Y7 | (0, 0, 0) | (-1, -1, -1) | (-2, -2, -2) | (-3, -3, -3) | (-4, -4, -4) | (-5, -5, -5) | (-6, -6, -6) |

METHOD FOR DETECTING POSITION OF MOBILE BODY

CROSS REFERENCE TO RELATED APPLICATIONS

This application claims the benefit of priority to Japanese Patent Application No. 2015-064678 filed on Mar. 26, 2015 and is a Continuation Application of PCT Application No. PCT/JP2016/057950 filed on Mar. 14, 2016. The entire contents of each application are hereby incorporated herein by reference.

BACKGROUND OF THE INVENTION

1. Field of the Invention

The present invention relates to a method for detecting a position of a mobile body and more particularly, to a method for detecting a position of a mobile body on a plane.

2. Description of the Related Art

When a mobile body moving on a plane is to be controlled, it is necessary to obtain a present position of the mobile body with high precision. Here, a method for detecting the position of the mobile body includes a method for detecting the position of the mobile body with a device having a sensor installed in or on the mobile body, and a position detecting sensor to detect the position of the mobile body in cooperation with the sensor installed in or on the mobile body.

Japanese Patent Application Laid-Open No. 7-140241 discloses a device and a method for detecting the position of the mobile body by the above method.

In the device disclosed in Japanese Patent Application Laid-Open No. 7-140241, as illustrated in FIG. 12, a receiver 114 for receiving an ultrasonic wave is used as the sensor installed in a mobile body 113, and two transmitters 112a and 112b for transmitting the ultrasonic wave are used as the position detecting sensor. The transmitters 112a and 112b are set so that a predetermined distance d1 is provided between them.

Thus, this device is configured such that distances d2 and d3 between the two transmitters 112a and 112b, and the receiver 114 are determined based on a transmission time of ultrasonic signals from the two transmitters 112a and 112b to the receiver 114, and the position of the mobile body 13 is determined based on the Pythagorean theorem.

However, the method for detecting the position disclosed in Japanese Patent Application Laid-Open No. 7-140241 has the problem that a position detection error of the mobile body 113 tends to be large, so that it is difficult to detect the position of the mobile body 113 with high precision.

SUMMARY OF THE INVENTION

Preferred embodiments of the present invention provide a method for detecting a position of a mobile body moving on a plane with high precision.

A method for detecting a position of a mobile body according to a preferred embodiment of the present invention is a method for detecting a position of a mobile body on a plane with a position detecting sensor to detect the position of the mobile body in cooperation with a sensor installed in or on the mobile body moving on the plane, and the method includes the steps of: assuming X-Y coordinates on the plane; disposing one of the mobile body including the sensor at a predetermined position and a dummy mobile body including a sensor at the same position as the mobile body, at a plurality of positions specified by the X-Y coordinates on the plane, which are different positions in X direction and Y direction; acquiring calibration X-Y coordinate data by detecting the position of one of the mobile body and the dummy mobile body at each of the plurality of positions, with the position detecting sensor; determining correction data for the plurality of positions, based on a difference between the acquired calibration X-Y coordinate data, and true position data regarding the plurality of positions where one of the mobile body and the dummy mobile body is disposed; and in a stage to actually detect the position of the mobile body moving on the plane, detecting a position of the mobile body moving on the plane with the position detecting sensor to acquire a detected X-Y coordinate data, and obtaining a position data close to a true position of the mobile body by correcting the detected X-Y coordinate data by an interpolation method using the correction data.

A method for detecting a position of a mobile body according to a preferred embodiment of the present invention is a method for detecting a position of a mobile body on a plane with a position detecting sensor to detect the position of the mobile body in cooperation with a sensor installed in or on the mobile body moving on the plane, and the method includes the steps of: assuming X-Y coordinates, a plurality of X-axis direction reference lines parallel to an X-axis direction, and a plurality of Y-axis direction reference lines parallel to a Y-axis direction, on the plane; disposing one of the mobile body including the sensor at a predetermined position and a dummy mobile body including a sensor at the same position as the mobile body, on a plurality of intersection points of the X-axis direction reference lines and the Y-axis direction reference lines; acquiring calibration X-Y coordinate data by detecting the position of one of the mobile body and the dummy mobile body at each of the plurality of intersection points, with the position detecting sensor; determining position variation amounts in the X-axis direction and the Y-axis direction at the plurality of intersection points, as an X-axis direction error and a Y-axis direction error, based on a difference between the acquired calibration X-Y coordinate data, and true position data regarding the plurality of intersection points where one of the mobile body and the dummy mobile body is disposed; determining an X-axis direction error approximate formula and a Y-axis direction error approximate formula based on the X-axis direction error and the Y-axis direction error, the X-axis direction error approximate formula and the Y-axis direction error approximate formula each being a formula to calculate an error at each position on the plurality of X-axis direction reference lines and the plurality of Y-axis direction reference lines, and in a stage to actually detect the position of the mobile body moving on the plane, detecting a position of the mobile body moving on the plane with the position detecting sensor to acquire a detected X-Y coordinate data, and obtaining a position data close to a true position of the mobile body by correcting the detected X-Y coordinate data by a linear interpolation method using the X-axis direction error approximate formula and the Y-axis direction error approximate formula.

Furthermore, in a preferred embodiment of the present invention, the concept that the X-Y coordinates, and the plurality of parallel reference lines in the X-axis direction and the Y-axis direction (the X-axis direction reference lines and the Y-axis direction reference lines) are assumed on the plane includes a case where the X-Y coordinates, the X-axis direction reference lines and the Y-axis direction reference lines are actually drawn on the plane, and a case where they are shown by an optical method without being actually drawn.

Furthermore, according to the above method for detecting the position of the mobile body, in a case where the mobile body includes a plurality of sensors at predetermined positions, a rotation direction position of the mobile body rotated around a rotation axis which is an axis perpendicular to the plane is able to be detected, based on a positional relationship of the plurality of sensors detected with the position detecting sensor, the method preferably further includes the steps of: acquiring calibration rotation direction position data by detecting a rotation direction position of one of the mobile body and the dummy mobile body with the position detecting sensor at each of the plurality of intersection points after one of the mobile body including a plurality of sensors at the predetermined positions and the dummy mobile body including the plurality of sensors at the same positions as the mobile body is disposed on the plurality of intersection points so that the rotation direction position of one of the mobile body and the dummy mobile body faces a predetermined direction; determining a rotation direction position error at the plurality of intersection points, based on a difference between the acquired calibration rotation direction position data, and true rotation direction position data regarding the plurality of intersection points; determining a rotation direction error approximate formula based on the rotation direction position error, the formula being a formula to calculate an error at each position, and in a stage to actually detect the rotation direction position of the mobile body moving on the plane, detecting a rotation direction position of the mobile body moving on the plane with the position detecting sensor to acquire a detected rotation direction position data, and obtaining a rotation direction position data close to a true rotation direction position of the mobile body by correcting the detected rotation direction position data by a linear interpolation method using the rotation direction error approximate formula.

With the above configuration, the error of the rotation direction position data detected with respect to the mobile body is corrected, and the rotation direction position of the mobile body is able to be detected with high precision, in addition to the position of the mobile body on the plane (the position in the X-axis direction and Y-axis direction).

According to the methods for detecting the position of the mobile body of preferred embodiments of the present invention, as described above, the position of the mobile body moving on the plane is detected by the position detecting sensor, the acquired detected X-Y coordinate data is corrected by the interpolation method using the correction data, so that the position data close to the true position of the mobile body is able to be obtained. Thus, the error of the X-Y coordinate position detected with respect to the mobile body is corrected, and the position of the mobile body moving on the plane is able to be detected with high precision.

Furthermore, according to another method for detecting the position of the mobile body of another preferred embodiment of the present invention, the calibration X-Y coordinate data is acquired by detecting the position of the mobile body (or the dummy mobile body) at each of the plurality of intersection points, with the position detecting sensor, the position variation amounts in the X-axis direction and the Y-axis direction at the plurality of intersection points are determined, as the X-axis direction error and the Y-axis direction error, based on the difference between the acquired calibration X-Y coordinate data, and the true position data acquired when the mobile body (or the dummy mobile body) is disposed at the plurality of intersection points, the X-axis direction error approximate formula and the Y-axis direction error approximate formula defining formulas to calculate the error at each position on the plurality of X-axis direction reference lines and the plurality of Y-axis direction reference lines are determined based on the X-axis direction error and the Y-axis direction error, and in the stage to actually detect the position of the mobile body moving on the plane, the position of the mobile body moving on the plane is detected with the position detecting sensor, and the acquired detected X-Y coordinate data is corrected by an interpolation method using the X-axis direction error approximate formula and the Y-axis direction error approximate formula to obtain the position data close to the true position of the mobile body. As a result, the position data close to the true position of the mobile body is able to be easily and precisely detected.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a view showing one example of variation amounts (X-axis direction error, Y-axis direction error, rotation direction position error) between X-Y coordinate data and rotation direction position data detected with the dummy mobile body, and true X-Y position data and true rotation direction position data.

FIGS. 6A to 6C are views showing error approximate formulas when the errors at the respective positions on the reference lines are expressed by approximate curves, in which FIG. 6A shows X-axis direction error approximate formulas, FIG. 6B shows Y-axis direction error approximate formulas, and FIG. 6C shows rotation direction position error approximate formulas.

FIGS. 9A and 9B are views for explaining how to correct X coordinate data detected in the actually detecting stage (B), in which FIG. 9A is a view showing a method for determining X-axis direction error using the error approximate formulas shown in FIG. 6A, and FIG. 9B is a view showing a method for determining a correction amount with respect to the detected X coordinate data by performing linear interpolation using the X-axis direction error determined in FIG. 9A.

DETAILED DESCRIPTION OF THE PREFERRED EMBODIMENTS

Next, the present invention will be described more in detail with respect to preferred embodiments of the present invention.

Furthermore, in a preferred embodiment of the present invention, a method for detecting a position of a mobile body will be described in a case where the mobile body is a sphere-ride robot which is configured such that when a sphere is rolled while a robot body rides on the sphere, the robot body can move on a plane together with the sphere or rotate on the sphere.

Figure 2:
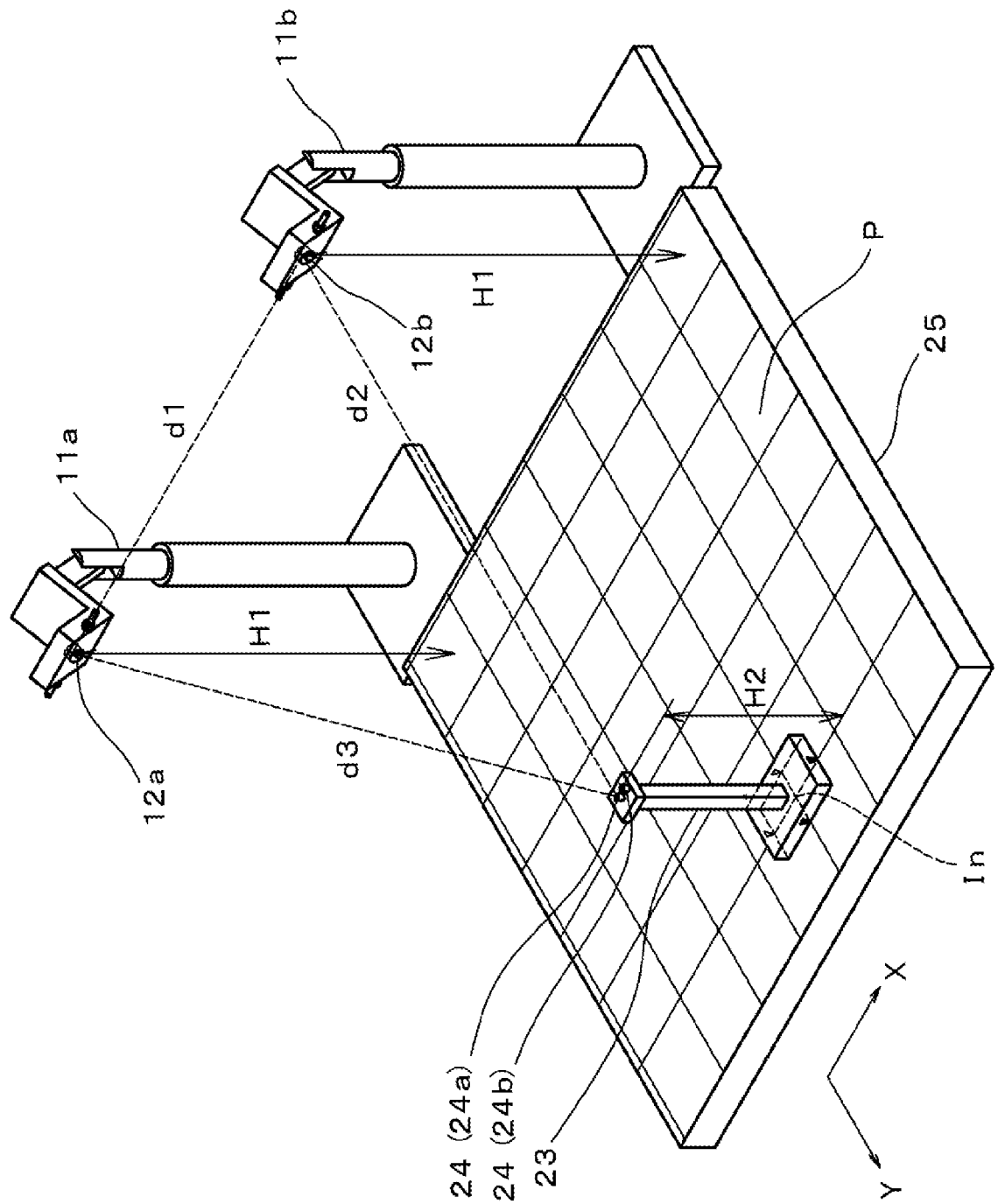
FIG. 2 is a perspective view of a device that detect a position of a dummy mobile body, in the preparing stage (A) shown in FIG. 1.

According to the method in this preferred embodiment, as shown in FIG. 2, a position of a mobile body 13 (FIG. 7) is detected as shown in FIG. 2, with two position detecting sensors (ultrasonic transmitters) 12a and 12b held by sensor holders 11a and 11b, in cooperation with sensors 24 (24a, 24b) installed in a dummy mobile body 23, and sensors 14 (14a, 14b) installed in or on the mobile body 13.

First, a device which is used to implement a method for detecting the position of the mobile body according to a preferred embodiment of the present invention will be described.

Figure 7:
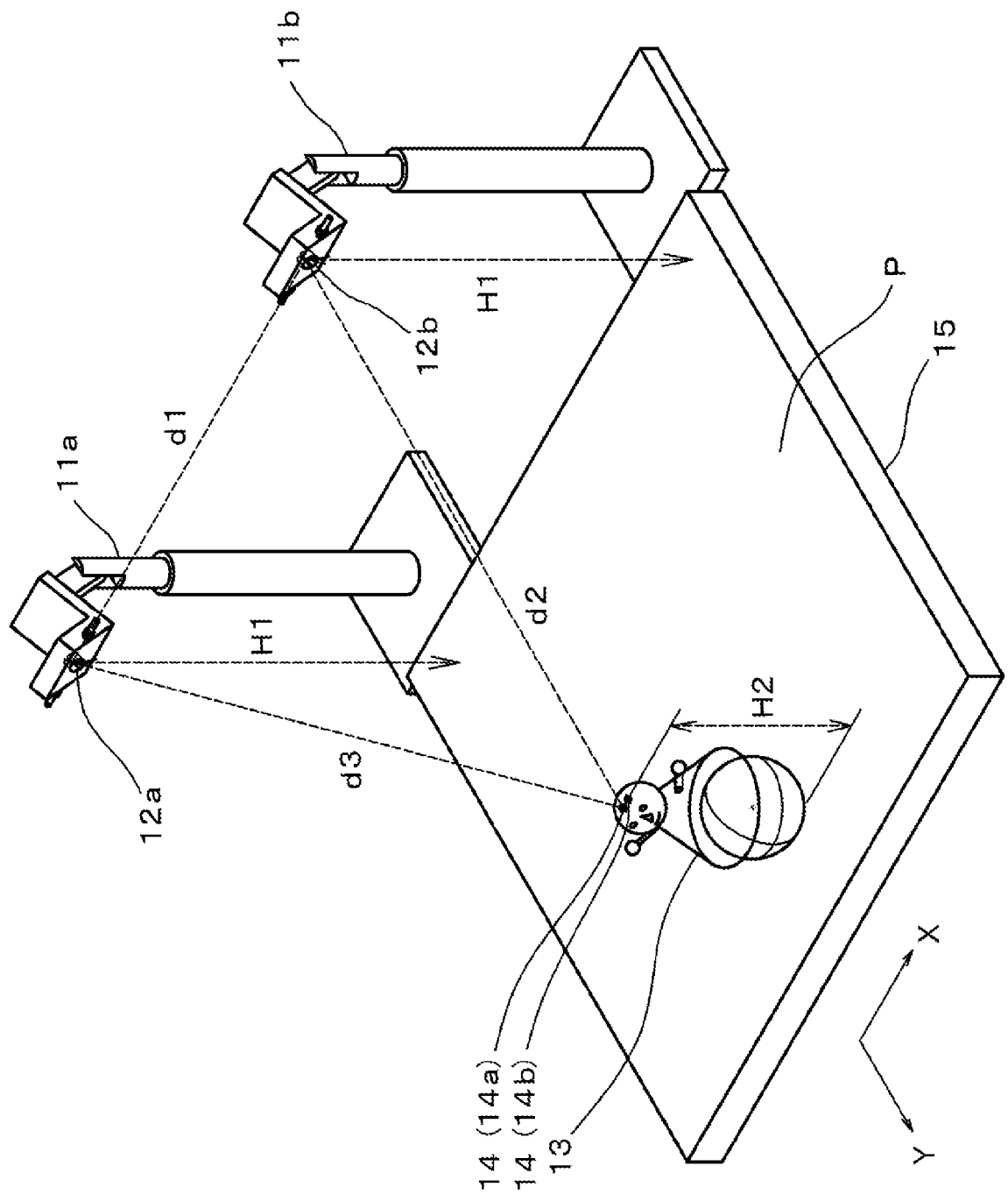
FIG. 7 is a perspective view of a device that detects the position of the mobile body in the actually detecting stage (B) shown in FIG. 1.

In this preferred embodiment, as shown in FIG. 7, the device to be used to implement the method for detecting the position of the mobile body includes, the two position detecting sensors (ultrasonic transmitters) 12a and 12b to detect the position of the mobile body 13 in cooperation with the sensors 14 (14a, 14b) installed in or on the mobile body 13 to be moved on a plane P which is an upper surface of a table 15.

The device is structured such that the two position detecting sensors (ultrasonic transmitters) 12a and 12b are separately held by the two sensor holders 11a and 11b, respectively and a height position H1 from the plane P defining and functioning as the upper surface of the table 15 and a horizontal distance d1 between the position detecting sensors 12 can be set to predetermined values.

Next, the method for detecting the position of the mobile body in this preferred embodiment will be described.

Figure 1:
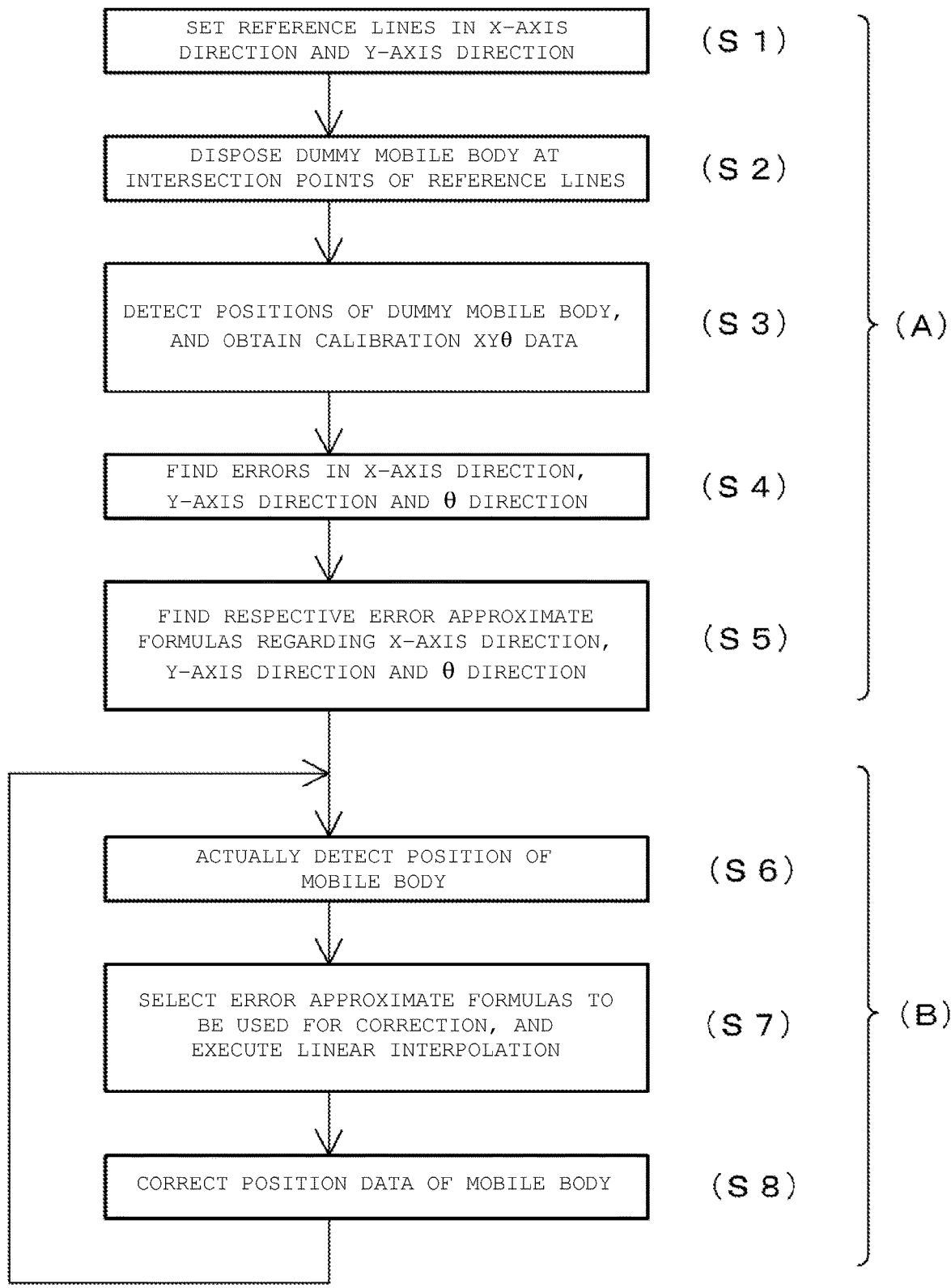
FIG. 1 is a view showing a flow of a method for detecting a position of a mobile body according to a preferred embodiment of the present invention, wherein (A) shows a flow of a preparing stage, and (B) shows a flow of an actually detecting stage to detect a position of the actually moving mobile body.

In addition, the method for detecting the position of the mobile body according to the present preferred embodiment includes a stage (preparing stage) (A) to find correction data to correct position data detected by the position detecting sensors 12a and 12b, prior to a stage to actually detect the position of the mobile body 13, and a stage (actually detecting stage) (B) to detect a position of the mobile body 13 in real time with the correction data determined in the preparing stage (A) while the mobile body 13 is actually moved (a position close to a true position after corrected with the correction data) (refer to FIG. 1).

Since the mobile body 13 in this preferred embodiment preferably is the sphere-ride robot, for example, it cannot stand alone without being controlled a posture detecting sensor and a control device. In order to enhance its operability, in a stage to obtain calibration data in the preparing stage (A), it is preferable to use the dummy mobile body 23 (refer to FIG. 2) including the sensors at the same positions as the mobile body (sphere-ride robot) 13 including the sensors 14 (14a, 14b) on the plane P when disposed on the table 15. Furthermore, the dummy mobile body 23 preferably includes the sensors 24 (24a, 24b) with the same characteristics as the sensors 14 (14a, 14b) of the mobile body (sphere-ride robot) 13.

However, the calibration data may be obtained by use of the mobile body (sphere-ride robot) 13 which is to be actually detected in its position in a case where a fall-prevention jig is used.

In addition, in this preferred embodiment, in the preparing stage (A) in which the calibration data is obtained and the correction data is determined, a table 25 (refer to FIG. 2) for the preparing stage is separately prepared and used as a table on which the dummy mobile body 23 is moved. Furthermore, the plane P (upper surface of the table 25) in this preferred embodiment is a 4-meter square plane, for example.

However, as the table which is used to obtain the calibration data, the same one as the table 15 (FIG. 7) which is used when the mobile body (sphere-ride robot) 13 is actually moved can be used.

Figure 3:
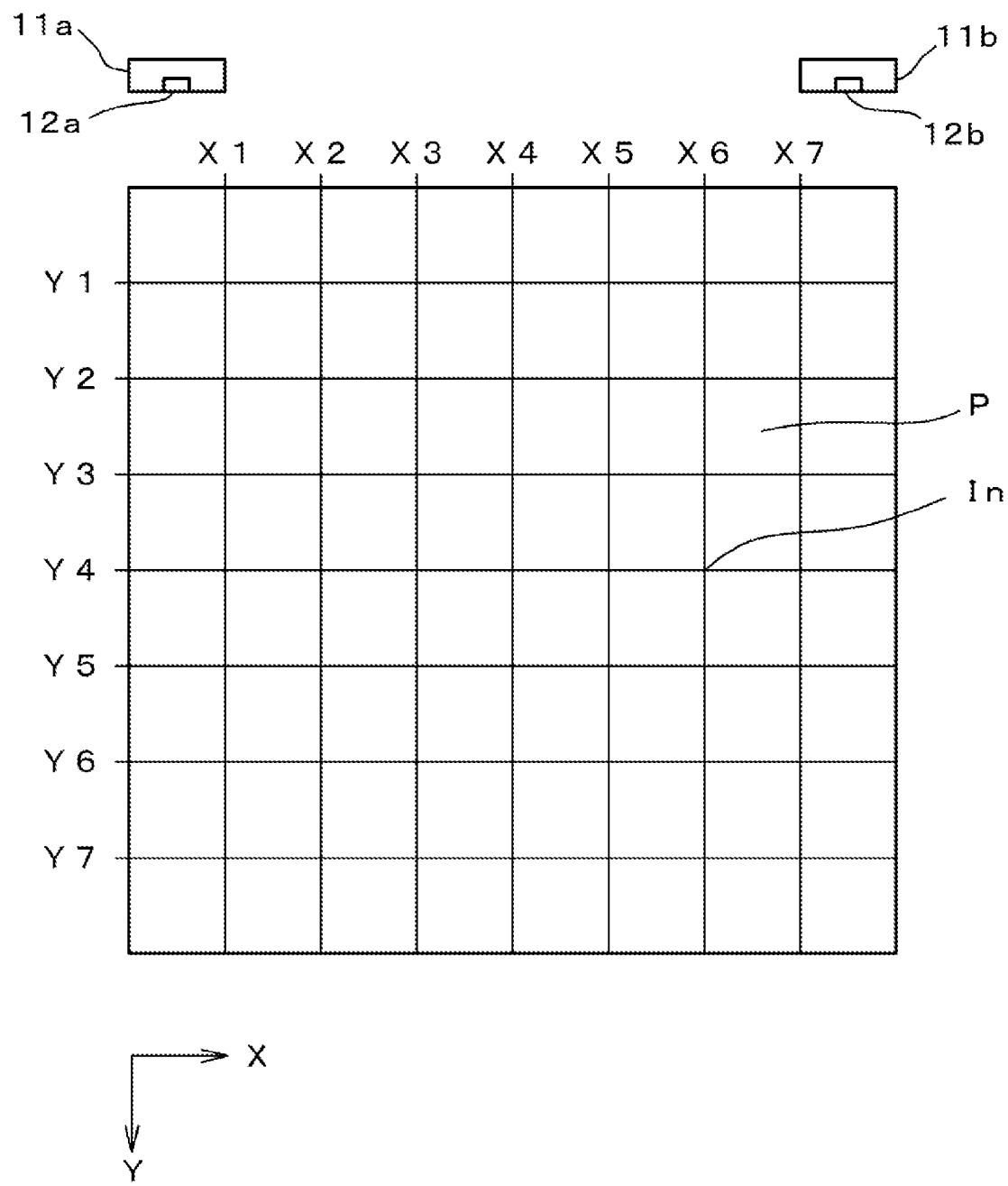
FIG. 3 is a view showing X-Y coordinates, X-axis direction reference lines, and Y-axis direction reference lines on a plane for the device shown in FIG. 2.

In the preparing stage (A), first, as shown in FIG. 3, X-Y coordinates are set on the plane P (the upper surface of the table 25), and a plurality of X-axis direction reference lines X1, X2, X3, X4, X5, X6 and X7 parallel to an X-axis direction, and a plurality of Y-axis direction reference lines Y1, Y2, Y3, Y4, Y5, Y6 and Y7 parallel to a Y-axis direction are set in the X-Y coordinates (FIG. 1: S1).

These X-axis direction reference lines X1 to X7 and the Y-axis direction reference lines Y1 to Y7 are provided on the plane P on the table 25 at equal or substantially equal intervals, for example.

Subsequently, as shown in FIG. 2, the dummy mobile body 23 is sequentially disposed on intersection points In of the X-axis direction reference lines X1 to X7 and the Y-axis direction reference lines Y1 to Y7 (FIG. 1: S2).

When the dummy mobile body 23 is disposed on each of the intersection points In of the X-axis direction reference lines X1 to X7 and the Y-axis direction reference lines Y1 to Y7, the dummy mobile body 23 is manually disposed on each of the intersection points In in this preferred embodiment.

Figure 4:
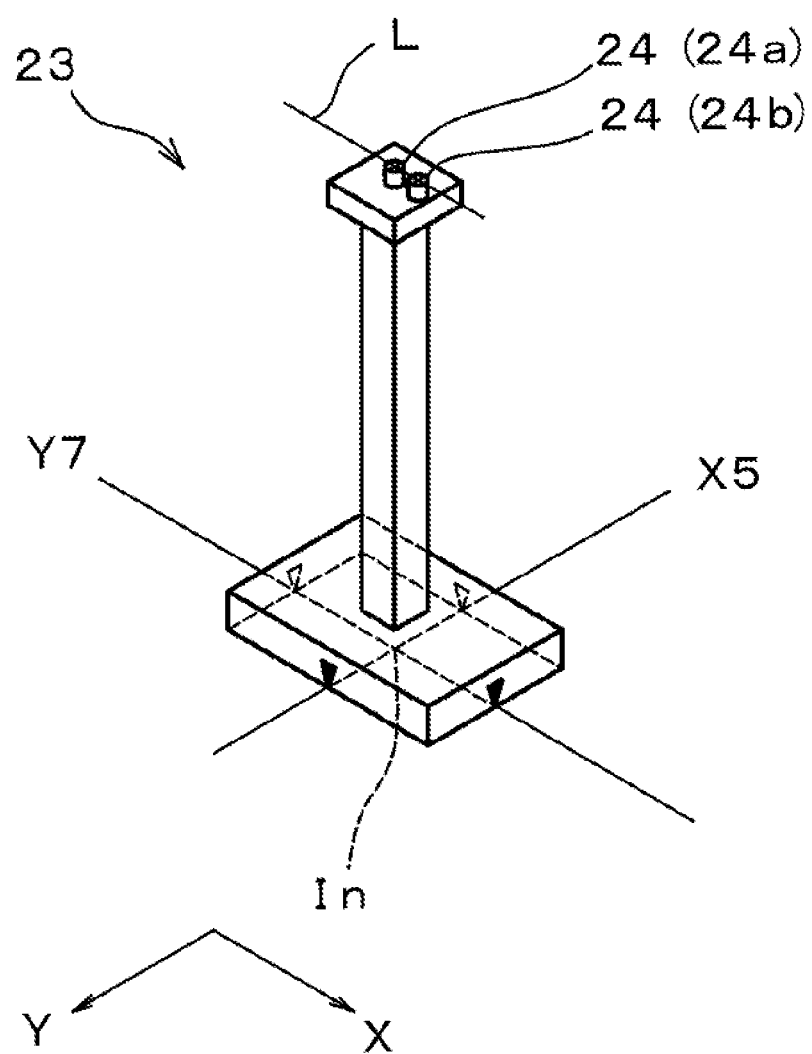
FIG. 4 is a view showing the dummy mobile body disposed on an intersection point of the X-axis direction reference line and the Y-axis direction reference line shown in FIG. 3.

In this preferred embodiment, as shown in FIG. 4, when triangular marks on the dummy mobile body 23 are positioned so as to coincide with the X-axis direction reference line X5 and the Y-axis direction reference line Y7, the dummy mobile body 23 is disposed such that a planar position of the sensor 24a installed in or on the dummy mobile body 23 correctly coincides with the intersection point In.

However, a center axis in a shape of the dummy mobile body 23 does not necessarily coincide with the one of the planar positions of the two sensors 24a and 24b installed in or on the dummy mobile body 23. As long as a positional relationship between the dummy mobile body 23, and the sensors 24a and 24b is kept at a predetermined correct positional relationship, an error between the true position (the position of the dummy mobile body 23 which has been actually disposed on the intersection point In) and the detected value is able to be correctly determined by the method in the present invention.

Furthermore, the dummy mobile body 23 is disposed on each of the intersection points In of the X-axis direction reference lines X1 to X7 and the Y-axis direction reference lines Y1 to Y7 such that a line L connecting the two sensors 24 (24a, 24b) installed in the dummy mobile body 23 surely keeps a predetermined angle (to be parallel or vertical, for example) with the X axis or the Y axis. That is, when the dummy mobile body 23 is disposed so that the line L connecting the two sensors 24 (24a, 24b) and one of the X axis and Y axis surely keep the predetermined angle, a rotation direction position (a position in a rotation direction around a rotation axis which is a vertical axis to the plane P) of the dummy mobile body 23 is able to be obtained based on an angle relation between the line L connecting the two sensors (24a, 24b) and one of the X axis and the Y axis.

Subsequently, the position of the dummy mobile body 23 on each of the plurality of intersection points In (49 intersection points in this preferred embodiment) is detected with the two position detecting sensors 12a and 12b. The position (X-Y coordinate position) of the dummy mobile body is calculated based on a transmission time of ultrasonic signals transmitted from the two position detecting sensors 12a and 12b to the sensor 24 installed in the dummy mobile body 23. More specifically, based on the transmission time of the ultrasonic signals, distances d2 and d3 between the two position detecting sensors 12a and 12b, and the sensor 24 (24a), respectively are obtained, and based on the Pythagorean theorem, the position of the dummy mobile body 23 is obtained. Thus, the position of the dummy mobile body 23 on each of the plurality of intersection points In is obtained as X-Y coordinate data to be used for calibration (hereinafter, referred to as calibration X-Y coordinate data) (FIG. 1: S3).

In addition, calibration data of the rotation direction position (hereinafter, referred to as calibration rotation direction position data) of the dummy mobile body 23 on each of the plurality of intersection points In is also obtained with the two sensors 24 (24a, 24b) installed in the dummy mobile body 23. More specifically, the data is obtained by determining a difference in time required for ultrasonic waves simultaneously emitted from the position detecting sensors 12a and 12b installed in or on at least one of the sensor holders 11a and 11b to reach the two sensors 24a and 24b of the dummy mobile body 23. Thus, based on the difference in time and a distance between the two adjacent sensors 24a and 24b, the rotation direction position is able to be determined with respect to each of the detected values of the dummy mobile body 23 in the X-Y coordinates.

Subsequently, based on a difference between the obtained calibration X-Y coordinate data, and the true position data of the dummy mobile body 23 on the plurality of intersection points In, position variation amounts in the X-axis direction and the Y-axis direction at the plurality of intersection points In are determined as X-axis direction errors Ex and Y-axis direction errors Ey (FIG. 1: S4).

Similarly, based on a difference between the obtained calibration rotation direction position data, and the true rotation direction position data at the plurality of intersection points In, rotation direction position variation amounts at the plurality of intersection points In are obtained as rotation direction position errors E$\theta$.

FIG. 5 shows one example of the X-axis direction errors Ex, the Y-axis direction errors Ey, and the rotation direction position errors E$\theta$ at the intersection points In.

For example, in FIG. 5, the X-axis direction error Ex, the Y-axis direction error Ey and the rotation direction position error E$\theta$ at the intersection point In of the X-axis direction reference line X1 and the Y-axis direction reference line Y1 are such that (Ex, Ey, E$\theta$)=(6.1 cm, 6 cm, 6°).

Figure 6A:
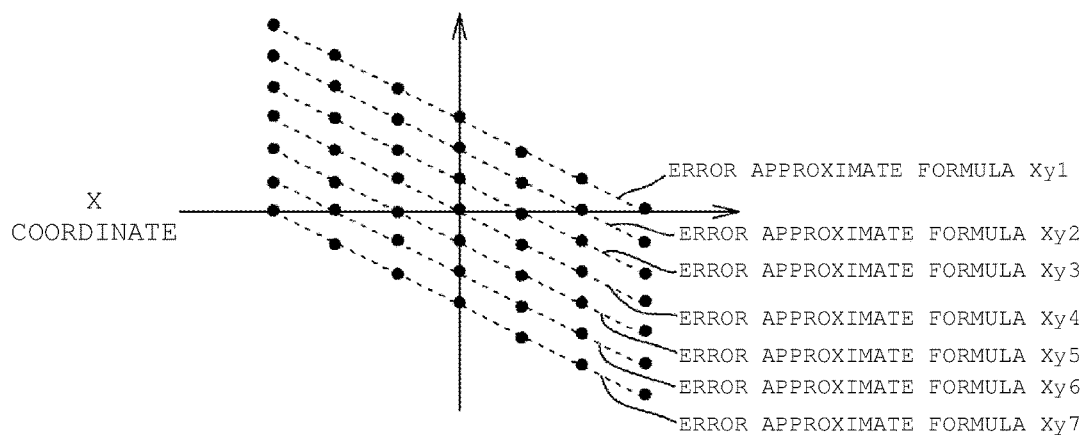
Figure 6B:
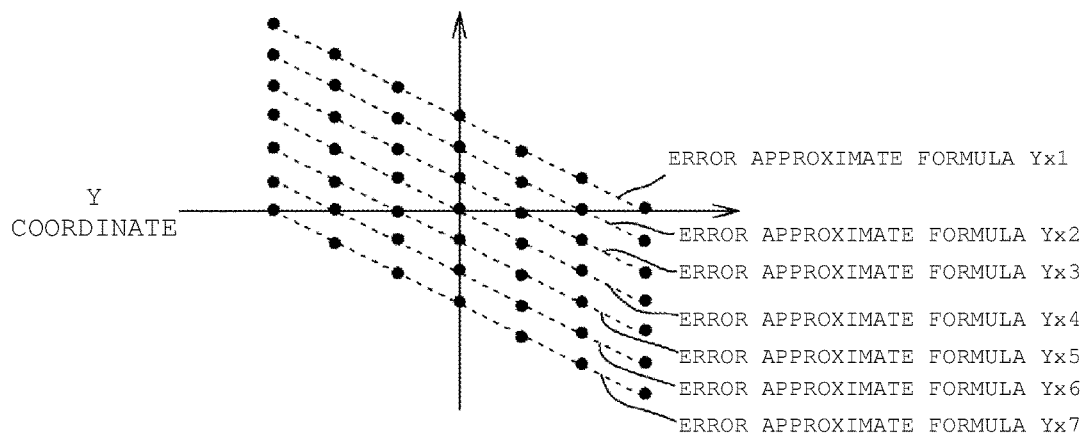
Figure 6C:
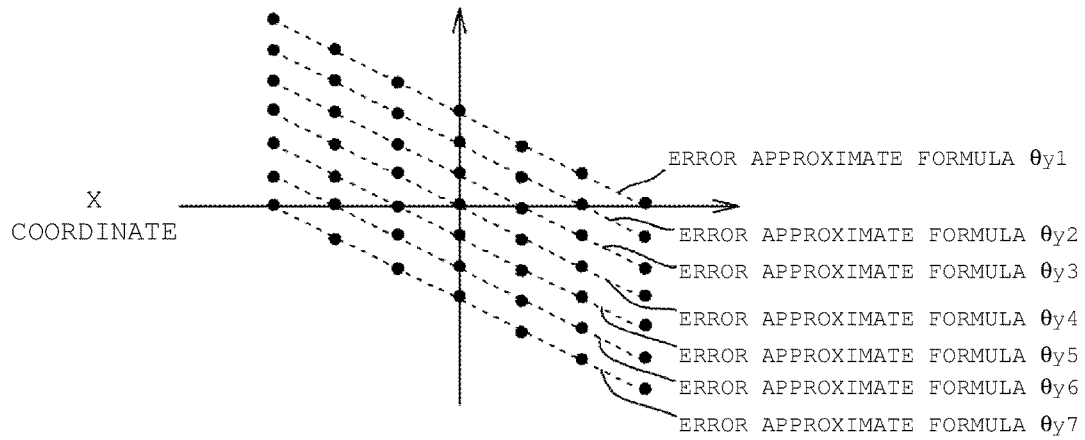

Subsequently, as illustrated in FIGS. 6A to 6C, based on the errors Ex, Ey and E$\theta$, error approximate formulas Xy1, Xy2, Xy3, Xy4, Xy5, Xy6 and Xy1 are determined as error calculation formulas at each of the X-axis direction reference lines X1 to X7, and error approximate formulas Yx1, Yx2, Yx3, Yx4, Yx5, Yx6 and Yx7 are determined as error calculation formulas at each of the Y-axis direction reference lines Y1 to Y7 (FIG. 1: S5).

Furthermore, error approximate formulas $\theta$y1, $\theta$y2, $\theta$y3, $\theta$y4, $\theta$y5, $\theta$y6 and $\theta$y7 of the rotation direction positions taken along each of the Y-axis direction reference lines Y1 to Y7 are determined.

When the X-axis direction error approximate formula Xy1 is determined, the X-axis direction errors Ex (6.1, 5, 4, 3, 2, 1, 0 from the left in FIG. 5) taken along the Y-axis direction reference line Y1 are to be focused on, and as shown in FIG. 6A, the X-axis direction errors Ex are plotted in relation to the X coordinate, and the fitting approximate formula is determined along the plotted points. Furthermore, the error approximate formula Xy1 is expressed by an n-th dimensional approximate formula (n is an integer smaller than the number of the intersection points in the X-axis direction and larger than or equal to zero) according to required precision. For example, the error approximate formula Xy1 in FIG. 6A is a first-dimensional approximate formula.

Similarly, the X-axis direction error approximate formulas Xy2 to Xy1 are determined as illustrated in FIG. 6A such that the X-axis direction errors Ex taken along each of the respective Y-axis direction reference lines Y2 to Y7 are focused on.

When the Y-axis direction error approximate formula Yx1 is determined, the Y-axis direction errors Ey (6, 5.1, 4, 3, 2, 1, 0 from the left in FIG. 5) taken along the X-axis direction reference line X1 are to be focused on, and as illustrated in FIG. 6B, the Y-axis direction errors Ey are plotted in relation to the Y coordinate, and the fitting approximate formula is determined along the plotted points. Furthermore, the error approximate formula Yx1 is also expressed by an n-th dimensional approximate formula (n is an integer smaller than the number of the intersection points in the Y-axis direction and larger than or equal to zero).

Similarly, the Y-axis direction error approximate formulas Yx2 to Yx7 are determined as illustrated in FIG. 6B such that Y-axis direction errors Ey taken along each of the respective X-axis direction reference lines X2 to X7 are focused on.

When the rotation direction position error approximate formula $\theta$y1 is determined, the rotation direction position errors E$\theta$ (6, 4.9, 4, 3, 2, 1, 0 from the left in FIG. 5) taken along the Y-axis direction reference line Y1 are to be focused on, and as illustrated in FIG. 6C, the rotation direction position errors E$\theta$ are plotted in relation to the X coordinate, and the fitting approximate formula is determined along the plotted points. Furthermore, the error approximate formula $\theta$y1 is also expressed by an n-th dimensional approximate formula (n is an integer smaller than the number of the intersection points in the X-axis direction and larger than or equal to zero).

Similarly, the rotation direction error approximate formulas $\theta$y2 to $\partial$y7 are determined as illustrated in FIG. 6C such that the rotation direction position errors Eθ taken along each of the respective Y-axis direction reference lines Y2 to Y7 are focused on.

Furthermore, in this preferred embodiment, the rotation direction position errors Eθ taken along the Y-axis direction reference lines Y1 to Y7 are focused on, but the rotation direction position errors Eθ taken along the X-axis direction reference lines X1 to X7 may be focused on to obtain the rotation direction position error approximate formulas θx1 to θx7.

After the required calibration data is obtained and the correction data is determined in the above preparing stage (A), the stage is moved to the stage (B) (actually detecting stage) in which the sphere-ride robot which is configured such that when the sphere is rotated while the robot body rides on the sphere, the robot body can move on the plane together with the sphere or rotate on the sphere is used as the mobile body 13, instead of the dummy mobile body 23, and the mobile body 13 is actually moved on the table 15 and its position is detected.

In the actually detecting stage (B), as illustrated in FIG. 7, the position of the mobile body 13 on the plane P is detected with the two position detecting sensors (ultrasonic transmitters) 12a and 12b to detect the position of the mobile body 13 in cooperation with the sensors (ultrasonic transmitters) 14 (14a, 14b) installed in or on the mobile body 13, (FIG. 1: S6). Furthermore, the two position detecting sensors 12a and 12b are fixed to the sensor holders 11a and 11b similarly in the preparing stage (A). Furthermore, the sensors 14 (14a, 14b) installed in or on the mobile body 13 have the same positional relationship as the sensors 24 (24a, 24b) installed in the dummy mobile body 23 used in the preparing stage (A).

The mobile body 13 is remotely operated by a control device such as computer (not shown) so that it can be moved on the table 15 in the predetermined direction. The two sensors 14 (14a, 14b) are installed in or on the mobile body 13 at a height of H2 from the plane P on the table 15.

Thus, the distances d2 and d3 between the two position detecting sensors 12a and 12b, and the sensor 14 are determined based on a transmission time of the signals from the two position detecting sensors 12a and 12b to the sensor 14 installed in or on the mobile body 13. In the actually detecting stage (B), the height position H1 of the two position detecting sensors 12a and 12b and a distance d1 between them are set to be at the similar values as in the preparing stage (A), and the position of the mobile body 13 on the plane P is able to be detected from the relation of three sides of the triangle.

At this time, X-Y coordinate data detected with the position detecting sensors 12a and 12b (hereinafter, referred to as the detected X-Y coordinate data) is corrected by an interpolation method such as linear interpolation, so that position data close to the true position of the mobile body 13 is able to be obtained.

Furthermore, the rotation direction position data of the mobile body 13 detected with the position detecting sensors 12a and 12b (hereinafter, referred to as the detected rotation direction position data) is corrected by the interpolation method, so that the rotation direction position data close to the true rotation direction position of the mobile body 13 is able to be obtained.

Figure 8:
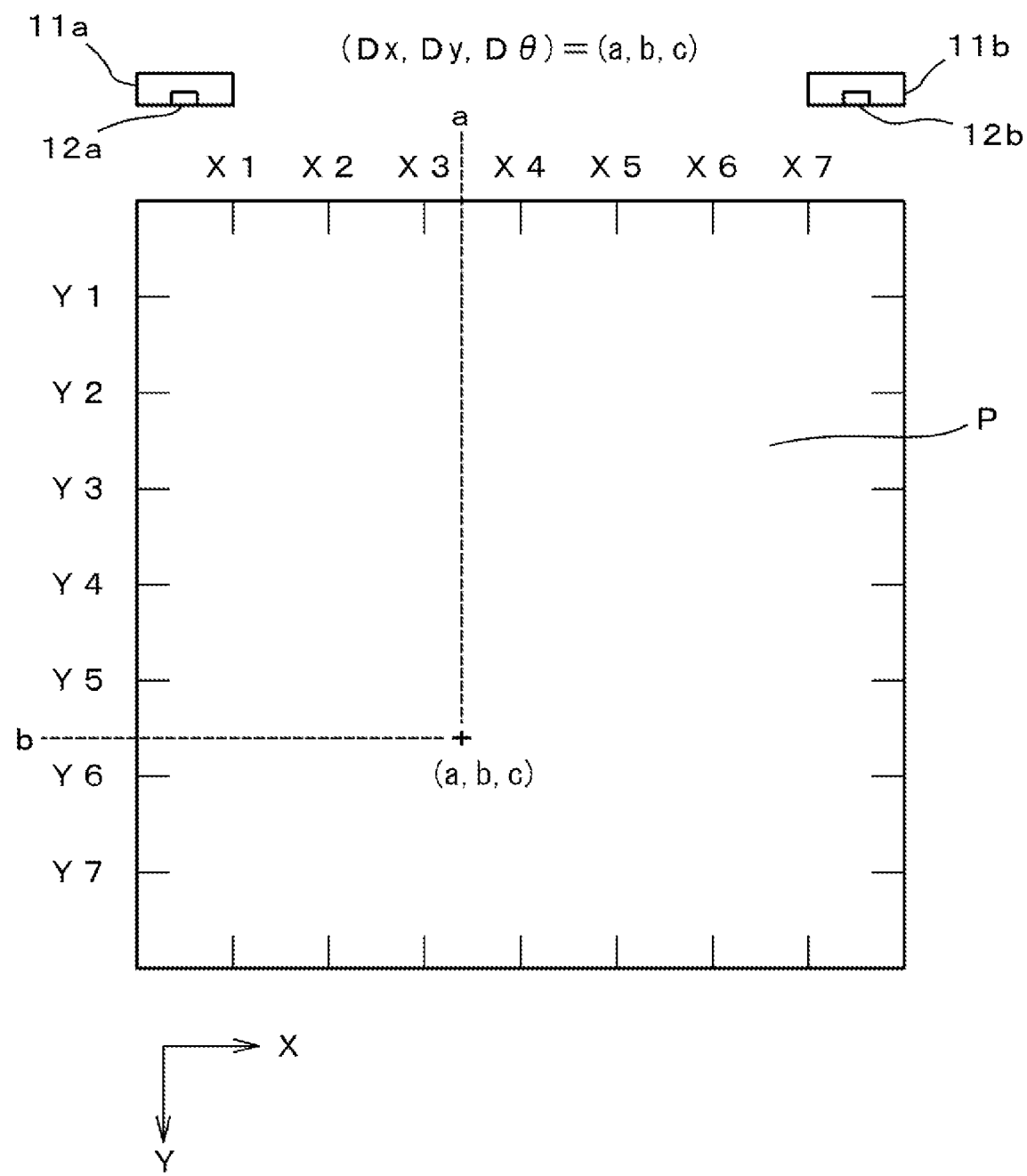
FIG. 8 is a view showing coordinate data and rotation direction position data of the mobile body detected with a position detecting sensor, in the actually detecting stage (B).

More specifically, as illustrated in FIG. 8, in a case where detected X coordinate data Dx, detected Y coordinate data Dy and detected rotation direction position data DO of the mobile body 13 detected with the position detecting sensors 12a and 12b are such that (Dx, Dy, Dθ)=(a, b, c), the position data close to the true position of the mobile body 13 is obtained by the following method.

Figure 9A:
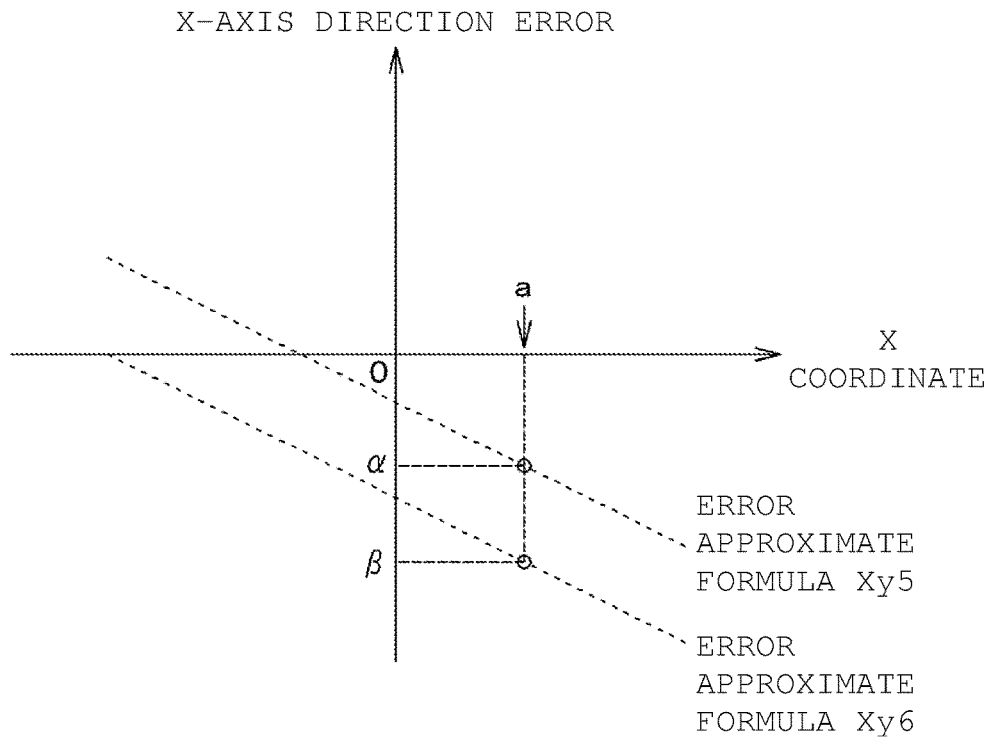

In a case where the detected X coordinate data Dx is corrected, first, among the error approximate formulas Xy1 to Xy1 shown in FIG. 6A, the error approximate formulas Xy5 and Xy6 taken along reference lines Y5 and Y6 which are positioned in the vicinity of the detected Y coordinate data Dy=b are selected. Thus, as illustrated in FIG. 9A, in a coordinate system in which a horizontal axis represents the X coordinate, and a vertical axis represents the X-axis direction error, based on the error approximate formulas Xy5 and Xy6 when the X coordinate data Dx=a, X-axis direction errors α and β are determined, respectively.

Figure 9B:
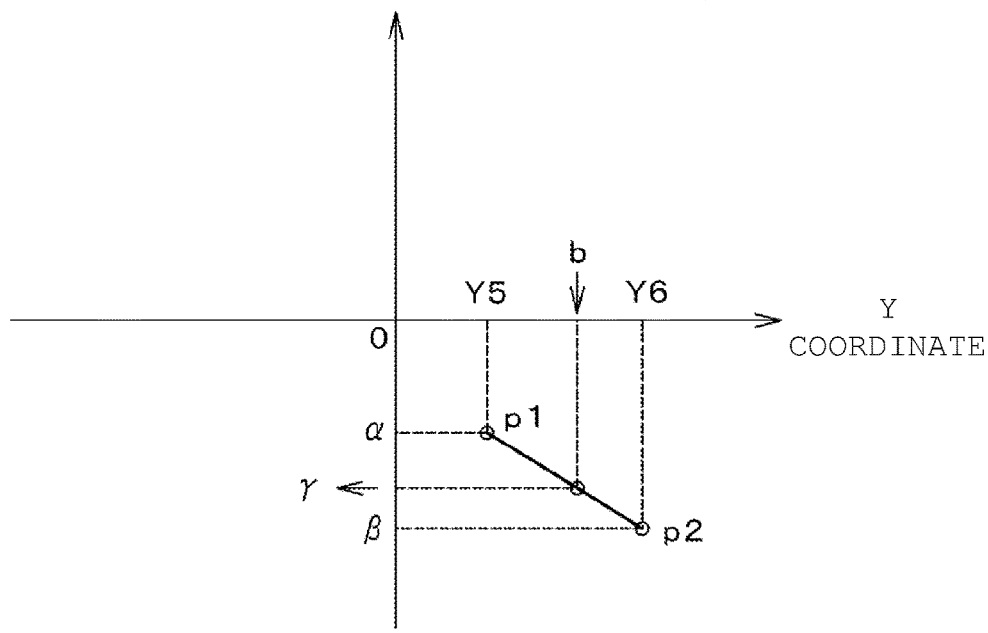

Subsequently, as shown in FIG. 9B, in a coordinate system in which a horizontal axis represents the Y coordinate, and a vertical axis represents the X-axis direction error, a point p1 intersecting with the X-axis direction error α and the Y coordinate Y5 is connected to a point p2 intersecting with the X-axis direction error β and the Y coordinate Y6 with a straight line. Thus, on the line p1 to p2, the linear interpolation is performed such that an X-axis direction error γ is determined based on the detected Y coordinate data Dy=b (FIG. 1: S7).

The determined X-axis direction error γ corresponds to a variation amount from the true value (position variation amount to be corrected), and the X-axis direction error γ is corrected with respect to the detected X coordinate data Dx=a, so that X-axis direction position data close to the true position of the mobile body 13 is able to be obtained (FIG. 1: S8).

In addition, in the above, the linear interpolation has been performed with the first-dimensional function including the straight line p1 to p2, but the linear interpolation method is not limited to the first-dimensional linear interpolation, and the interpolation is able to be performed with any dimensional function based on data amount.

In a case where the detected Y coordinate data Dy is corrected, the correction is made similar to the case where the detected X coordinate data Dx is corrected as described above.

For example, among the error approximate formulas Yx1 to Yx7 illustrated in FIG. 6B, the error approximate formulas Yx3 and Yx4 taken along the reference lines X3 and X4 which are positioned in the vicinity of the detected X coordinate data Dx=a are selected, and in a coordinate system in which a horizontal axis represents the Y coordinate, and a vertical axis represents the Y-axis direction error, two Y-axis direction errors are obtained based on the two error approximate formulas Yx3 and Yx4. Thus, in a coordinate system in which a horizontal axis represents the X coordinate and a vertical axis represents the Y-axis direction error, a Y-axis direction error is determined based on the detected X coordinate data Dx=a.

This Y-axis direction error corresponds to a variation amount from the true value (position variation amount to be corrected), and the Y-axis direction error is corrected with respect to the detected Y coordinate data Dy=b, so that Y-axis direction position data close to the true position of the mobile body 13 is able to be obtained.

In a case where the detected rotation direction position data Dθ is corrected, the correction is made similar to the case where the detected X coordinate data Dx is corrected as described above.

For example, among the error approximate formulas θy1 to θy7 illustrated in FIG. 6C, the error approximate formulas θy5 and θy6 taken along the reference lines Y5 and Y6 which are positioned in the vicinity of the detected Y coordinate data Dy=b are selected, and in a coordinate system in which a horizontal axis represents the X coordinate, and a vertical axis represents the rotation direction position error, two rotation direction position errors are obtained based on the two error approximate formulas θy5 and θy6. Thus, in a coordinate system in which a horizontal axis represents the Y coordinate and a vertical axis represents the rotation direction position error, a rotation direction position error is obtained based on the detected Y coordinate data Dy=b.

This obtained rotation direction position error corresponds to a variation amount from the true value (rotation direction position variation amount to be corrected), and the rotation direction position error is corrected with respect to the detected rotation direction position data Dθ=c, so that rotation direction position data close to the true position of the mobile body 13 is able to be obtained.

Thus, as shown in FIG. 1, after the position data (X-Y coordinate data, and rotation direction position data) of the mobile body 13 has been corrected, the position of the mobile body 13 is detected again in the step S6, and the steps S6 to S8 are repeatedly carried out. In addition, the calculations for the X-Y coordinate data and the rotation direction position data are performed by a computer (not illustrated) in parallel.

Furthermore, the above preferred embodiment provides a position detection method in the case where the mobile body 13 is disposed inside the outermost reference lines, but in a case where the mobile body 13 is disposed outside the outermost reference lines, the above-described error approximate formulas may be used, or new error approximate formulas may be derived to obtain the position of the mobile body 13.

Figure 10A:
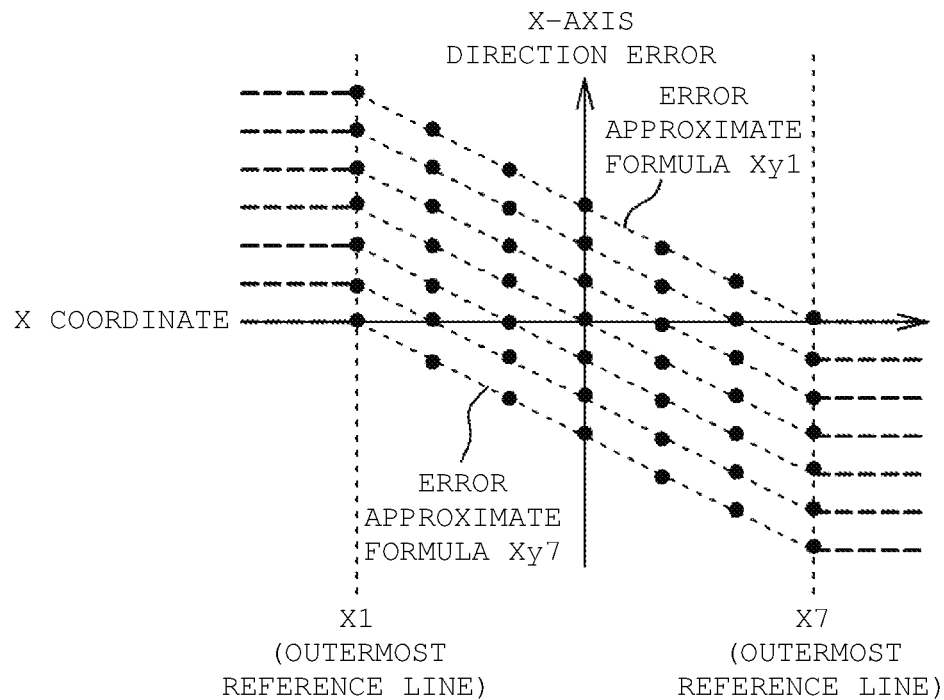
FIGS. 10A and 10B are views each for explaining a method for determining the position of the mobile body in a case where the mobile body exists outside the outermost X-axis direction reference lines.

For example, in a case where the detected X coordinate data Dx is positioned outside the outermost X-axis direction lines X1 and X7, the position of the mobile body 13 is determined, with a tilt of the error approximate formula outside the X coordinates of X1 and X7 regarded as zero, so that the position of the mobile body 13 is able to be obtained using the same value as that of the X-axis direction errors when the X coordinates are X1 and X7 (refer to FIG. 10A).

Figure 10B:
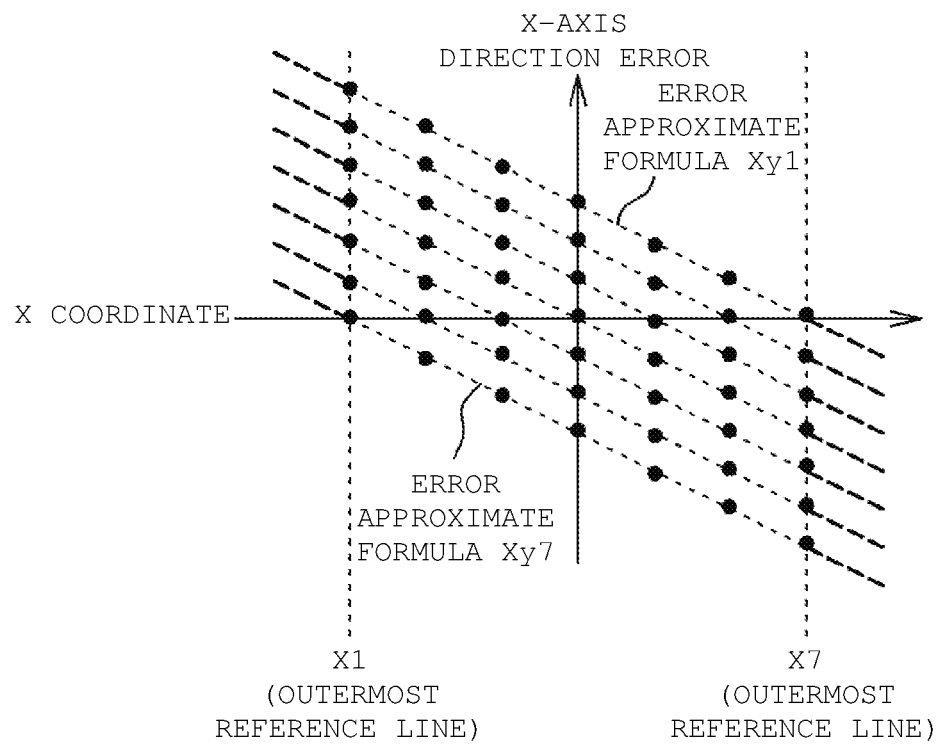

Alternatively, the error approximate formula may be extended outside the X coordinates of X1 and X7, and the position of the mobile body 13 is able to be obtained with the extended error approximate formula (refer to FIG. 10B).

Figure 11A:
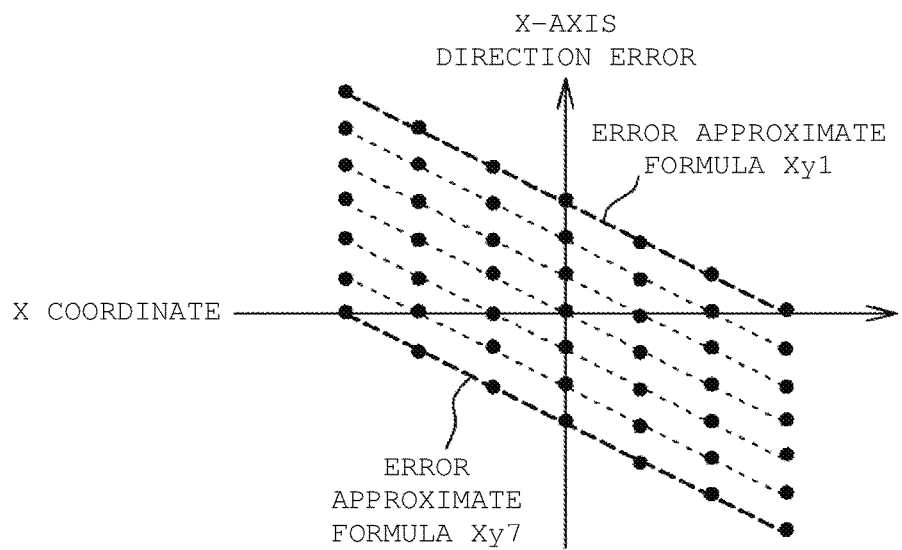
FIGS. 11A and 11B are views each for explaining a method for determining the position of the mobile body in a case where the mobile body exists outside the outermost Y-axis direction reference lines.

Furthermore, when the position of the mobile body 13 is obtained in a case where the detected Y coordinate data Dy is disposed outside the Y-axis direction lines Y1 and Y7, the position of the mobile body 13 is able to be determined with the error approximate formulas Xy1 and Xy7 taken along their inner closest reference lines (refer to FIG. 11A and FIG. 6A).

Figure 11B:
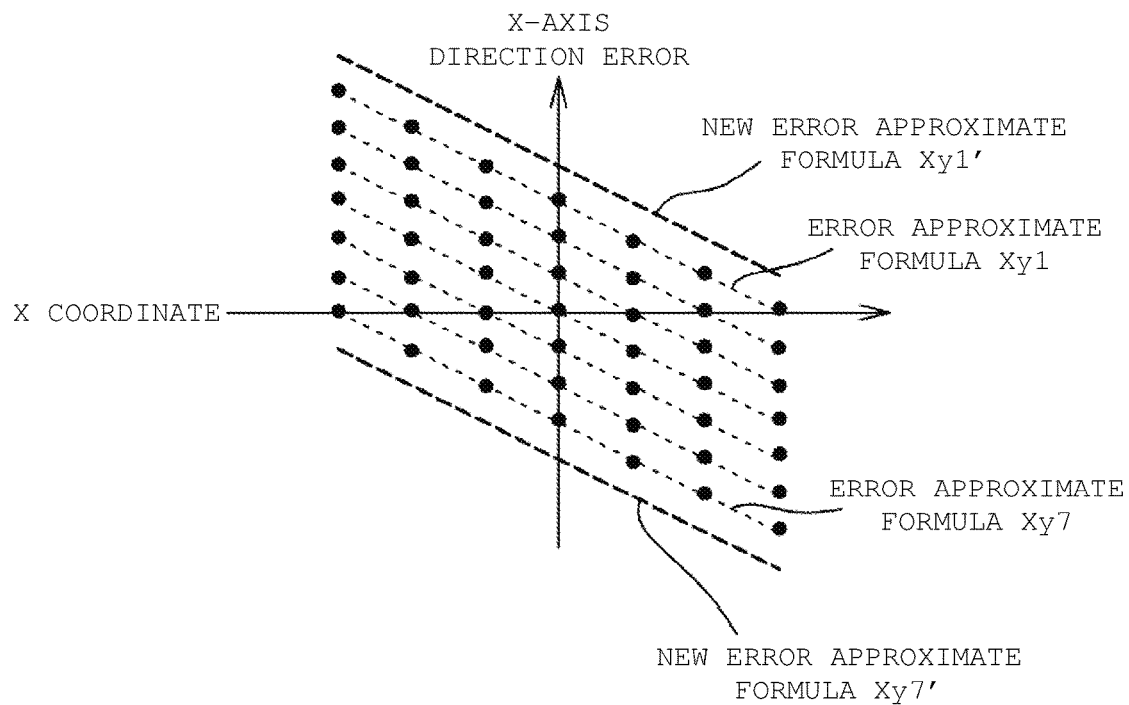
Figure 12:
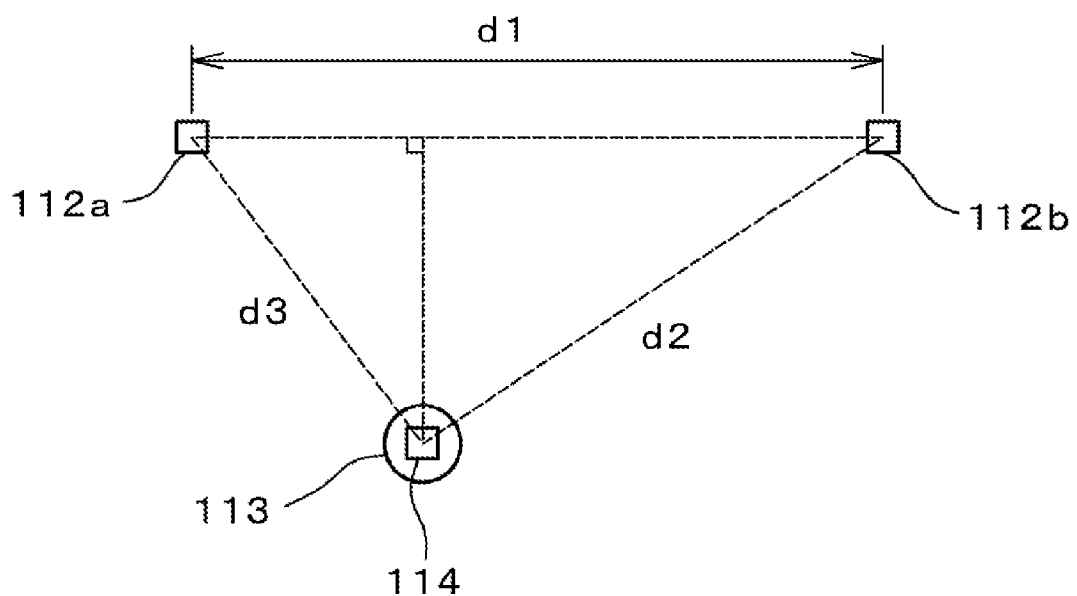
FIG. 12 is a view showing a conventional method for detecting a position of a mobile body.

Alternatively, new error approximate formulas Xy1' and Xy7' may be derived from the varying tendency of the error approximate formulas Xy1 to Xy7, and the position of the mobile body 13 is able to be obtained based on the new error approximate formulas (refer to FIG. 11B).

Furthermore, regarding the Y-axis direction error and the rotation direction position error, these errors are able to be treated in the same way.

According to the method for detecting the position of the mobile body including the above configuration, in the preparing stage (A), the correction data is obtained to correct the position data detected by the position detecting sensors 12a and 12b, so that as long as the height position H1 and the distance d1 of the two position detecting sensors 12a and 12b are set in the same condition as in the preparing stage (A), the position of the mobile body 13 is able to be correctly detected even in a case where the position of the mobile body 13 is detected in another circumstance (such as different venue).

Furthermore, in the above preferred embodiment, the ultrasonic receiver is preferably used as the sensors 14 and 24 installed in or on the mobile body 13 and the dummy mobile body 23, respectively and the ultrasonic transmitter is preferably used as the position detecting sensor, but the distances d2 and d3 are able to be obtained with the ultrasonic receiver and the ultrasonic transmitter exchanged. Furthermore, an ultrasonic sensor including both receiving and transmitting functions may be used as the position detecting sensors 12a and 12b.

In addition, in the above preferred embodiment, the two position detecting sensors (ultrasonic transmitters) 12a and 12b are preferably held by the sensor holders 11a and 11b, for example, but the position detecting sensor may be installed in or on the mobile body 13 or the dummy mobile body 23.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for detecting a position of a mobile body on a plane with a position detecting sensor to detect the position of the mobile body in cooperation with a sensor in or on the mobile body moving on the plane, the method comprising the steps of:
   assuming X-Y coordinates on the plane;
   disposing one of the mobile body including the sensor at a predetermined position and a dummy mobile body including a sensor at a same position as the mobile body, at a plurality of positions specified by the X-Y coordinates on the plane, which are different positions in an X direction and a Y direction;
   acquiring calibration X-Y coordinate data by detecting the position of one of the mobile body and the dummy mobile body at each of the plurality of positions, with the position detecting sensor;
   determining correction data for the plurality of positions, based on a difference between the acquired calibration X-Y coordinate data, and true position data regarding the plurality of positions where one of the mobile body and the dummy mobile body is disposed; and
   in a stage to actually detect the position of the mobile body moving on the plane, detecting a position of the mobile body moving on the plane with the position detecting sensor to acquire a detected X-Y coordinate data, and obtaining a position data close to a true position of the mobile body by correcting the detected X-Y coordinate data by an interpolation method using the correction data.

2. The method according to claim 1, wherein the mobile body is a robot or a sphere-ride robot.

3. The method according to claim 1, wherein the mobile body is capable of moving on the plane or rotating on a sphere.

4. The method according to claim 1, wherein the position detecting sensor includes an ultrasonic transmitter.

5. The method according to claim 1, wherein the position detecting sensor to detect the position of the mobile body includes two ultrasonic transmitters held by sensor holders.

6. The method according to claim 1, wherein the plane is a surface of a table.

7. The method according to claim 1, wherein the sensor of the mobile body and the sensor of the dummy mobile body have same characteristics.

8. The method according to claim 1, wherein the plurality of X-axis direction reference lines and the plurality of Y-axis direction reference lines are arranged on the plane at equal intervals or substantially equal intervals.

9. The method according to claim 1, wherein the sensor of the dummy mobile body includes two sensors, and a center axis of the dummy mobile body does not coincide with positions of the two sensors.

10. The method according to claim 1, wherein the sensor of the dummy mobile body includes two sensors, and the calibration X-Y coordinate data of the dummy mobile body at each of the plurality of positions is determined based on a transmission time of ultrasonic signals transmitted from the two sensors.

11. A method for detecting a position of a mobile body on a plane with a position detecting sensor to detect the position of the mobile body in cooperation with a sensor in or on the mobile body moving on the plane, the method comprising the steps of:
assuming X-Y coordinates, a plurality of X-axis direction reference lines parallel to an X-axis direction, and a plurality of Y-axis direction reference lines parallel to a Y-axis direction, on the plane;
disposing one of the mobile body including the sensor at a predetermined position and a dummy mobile body including a sensor at a same position as the mobile body, on a plurality of intersection points of the X-axis direction reference lines and the Y-axis direction reference lines;
acquiring calibration X-Y coordinate data by detecting the position of one of the mobile body and the dummy mobile body at each of the plurality of intersection points, with the position detecting sensor;
determining position variation amounts in the X-axis direction and the Y-axis direction at the plurality of intersection points, as an X-axis direction error and a Y-axis direction error, based on a difference between the acquired calibration X-Y coordinate data, and true position data regarding the plurality of intersection points where one of the mobile body and the dummy mobile body is disposed;
determining an X-axis direction error approximate formula and a Y-axis direction error approximate formula based on the X-axis direction error and the Y-axis direction error, the X-axis direction error approximate formula and the Y-axis direction error approximate formula each being a formula to calculate an error at each position on the plurality of X-axis direction reference lines and the plurality of Y-axis direction reference lines; and
in a stage to actually detect the position of the mobile body moving on the plane, detecting a position of the mobile body moving on the plane with the position detecting sensor to acquire a detected X-Y coordinate data, and obtaining a position data close to a true position of the mobile body by correcting the detected X-Y coordinate data by a linear interpolation method using the X-axis direction error approximate formula and the Y-axis direction error approximate formula.

12. The method according to claim 11, wherein
in a case where the mobile body includes a plurality of sensors at predetermined positions, a rotation direction position of the mobile body rotated around a rotation axis which is an axis perpendicular to the plane is capable of being detected based on a positional relationship of the plurality of sensors detected with the position detecting sensor; and
the method further comprises the steps of:
acquiring calibration rotation direction position data by detecting a rotation direction position of one of the mobile body and the dummy mobile body with the position detecting sensor at each of the plurality of intersection points after one of the mobile body including the plurality of sensors at the predetermined positions and the dummy mobile body including the plurality of sensors at the same positions as the mobile body is disposed on the plurality of intersection points so that the rotation direction position of one of the mobile body and the dummy mobile body faces a predetermined direction;
determining a rotation direction position error at the plurality of intersection points, based on a difference between the acquired calibration rotation direction position data, and true rotation direction position data regarding the plurality of intersection points;
determining a rotation direction error approximate formula based on the rotation direction position error used to calculate an error at each position; and
in a stage to actually detect the rotation direction position of the mobile body moving on the plane, detecting a rotation direction position of the mobile body moving on the plane with the position detecting sensor to acquire a detected rotation direction position data, and obtaining a rotation direction position data close to a true rotation direction position of the mobile body by correcting the detected rotation direction position data by a linear interpolation method using the rotation direction error approximate formula.

13. The method according to claim 11, wherein the mobile body is a robot or a sphere-ride robot.

14. The method according to claim 11, wherein the mobile body is capable of moving on the plane or rotating on a sphere.

15. The method according to claim 11, wherein the position detecting sensor includes an ultrasonic transmitter.

16. The method according to claim 11, wherein the position detecting sensor to detect the position of the mobile body includes two ultrasonic transmitters held by sensor holders.

17. The method according to claim 11, wherein the plane is a surface of a table.

18. The method according to claim 11, wherein the sensor of the mobile body and the sensor of the dummy mobile body have same characteristics.

19. The method according to claim 11, wherein the plurality of X-axis direction reference lines and the plurality of Y-axis direction reference lines are arranged on the plane at equal intervals or substantially equal intervals.

20. The method according to claim 11, wherein the sensor of the dummy mobile body includes two sensors, and a center axis of the dummy mobile body does not coincide with positions of the two sensors.

21. The method according to claim 11, wherein the sensor of the dummy mobile body includes two sensors, and the calibration X-Y coordinate data of the dummy mobile body at each of the plurality of positions is determined based on a transmission time of ultrasonic signals transmitted from the two sensors.

* * * * *